Feb. 12, 1952 F. H. OSBORNE 2,585,401
WALL BOX FOR REMOTE CONTROL SYSTEMS
Filed Oct. 23, 1947 7 Sheets-Sheet 3

INVENTOR.
FRED H. OSBORNE.
BY
Lockwood, Goldsmith & Galt
ATTORNEYS.

Feb. 12, 1952  F. H. OSBORNE  2,585,401
WALL BOX FOR REMOTE CONTROL SYSTEMS
Filed Oct. 23, 1947  7 Sheets-Sheet 5

Inventor
FRED H. OSBORNE.
By Lockwood, Goldsmith & Galt
Attorneys

Patented Feb. 12, 1952

2,585,401

UNITED STATES PATENT OFFICE 2,585,401

WALL BOX FOR REMOTE CONTROL SYSTEMS

Fred H. Osborne, Snyder, N. Y., assignor to The Rudolph Wurlitzer Company, North Tonawanda, N. Y., a corporation Application October 23, 1947, Serial No. 781,674

2 Claims. (Cl. 174—52)

This invention relates to a control system and selective actuation of remote mechanism in accordance with manual selections made immediate to and/or remote from said mechanism.

The present invention is capable of ready adaptation as a two-wire or a three-wire low frequency operating system or as a radio frequency operating system as desired.

Signals to be transmitted are in common with remote selection systems for the selection and playing of records in a remotely situated multiple record, selective phonograph, carried along light and power lines or are wireless transmitted from one or more spaced locations to the single mechanism such as a multiple playing record phonograph.

The invention is illustrated as employing alternating current impulses and of a frequency other than those normally carried by said power and light supply lines for power and light purposes.

Hereinafter the term "central" station is used to refer to the phonograph and its immediate control mechanism and the term "local" station or stations refers to what normally is called the wall box or boxes respectively where the manual selection is made.

All local stations provide for the selection of any one of a given number of selections, and all such selections so made at one or more local stations are registered and held in reserve at the central station, the selected records being played in the order of their selection except that duplicate selections are not duplicated.

One chief object of the present invention is to prevent the phonograph delivering a play, when the system is coin controlled, without the payment for that play.

Another chief object of the present invention is to provide the local and central stations with appropriate wiring and mechanism whereby the wall boxes and phonograph may be used with a two- or three-wire low frequency system or with a radio frequency system as desired or required and with a minimum of changes.

A further chief object of the present invention is to construct and arrange each local station or wall box so that the several mechanisms included therein are readily accessible for repair, adjustment or replacement purposes.

A still further chief object of the present invention is to construct and arrange each local station or wall box so that, while usually arranged for wire association, such wall box is readily and quickly adapted to wireless association and with a minimum of effort, etc.

Still another chief object of the invention is to provide mechanism for wire association and operation and capable of use as a two-wire or three-wire system by the use of the appropriate "shorting" unit such as a plug.

Other objects and features of the invention will be set forth more fully hereinafter.

The full nature of the invention will be understood from the accompanying drawings and the following description and claims:

Figure 2:
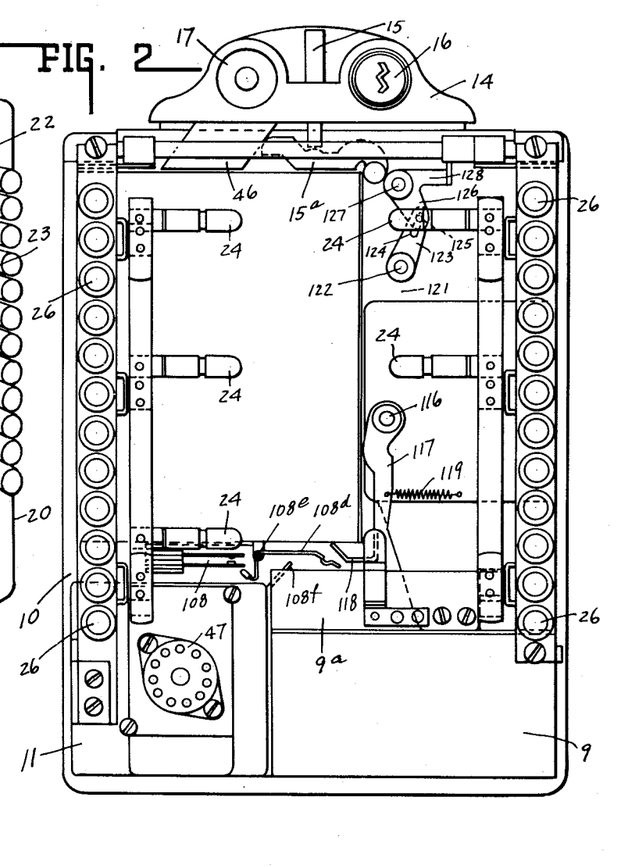
Fig. 2 is a front elevation thereof with cover removed, the wireless unit shown in Fig. 12 and the three-wire plug shown in Fig. 11 being omitted for clearness.
Figure 3:
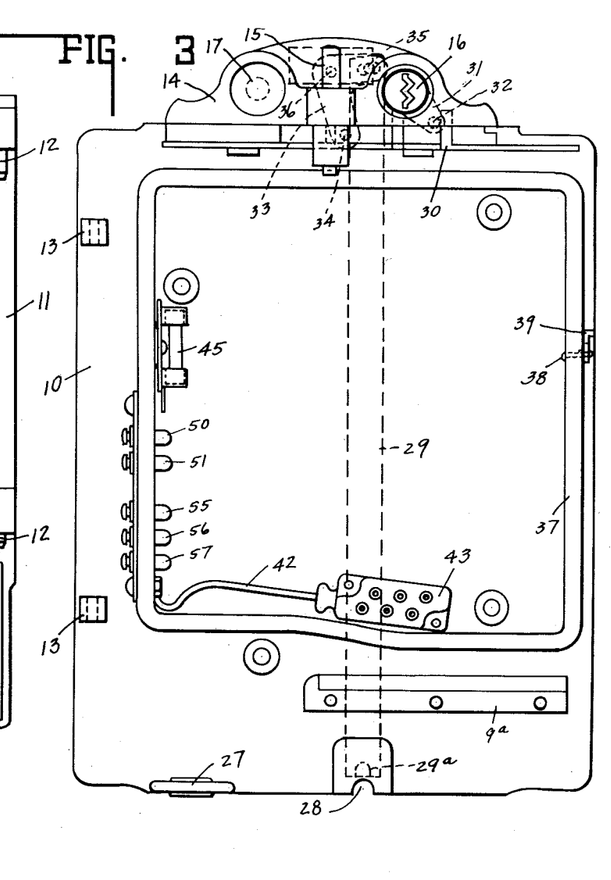
Fig. 3 is a similar view of the back portion only of the box when the intermediate mechanism (shown in Fig. 4) between it and the cover has been removed.
Figure 4:
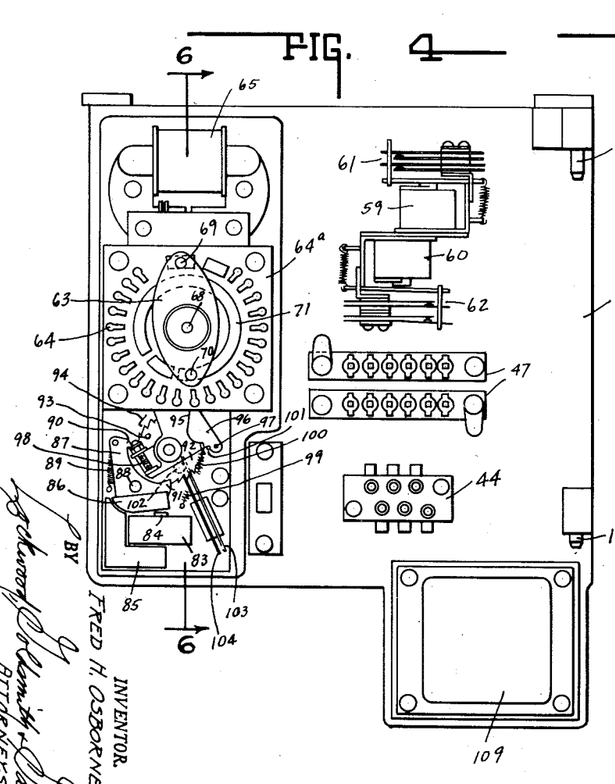
Fig. 4 is a rear elevation of the intermediate mechanism when exposed, the front thereof being shown in Fig. 2 and the wiring being omitted for clearness.
Figures 5, 6, 7, 8:
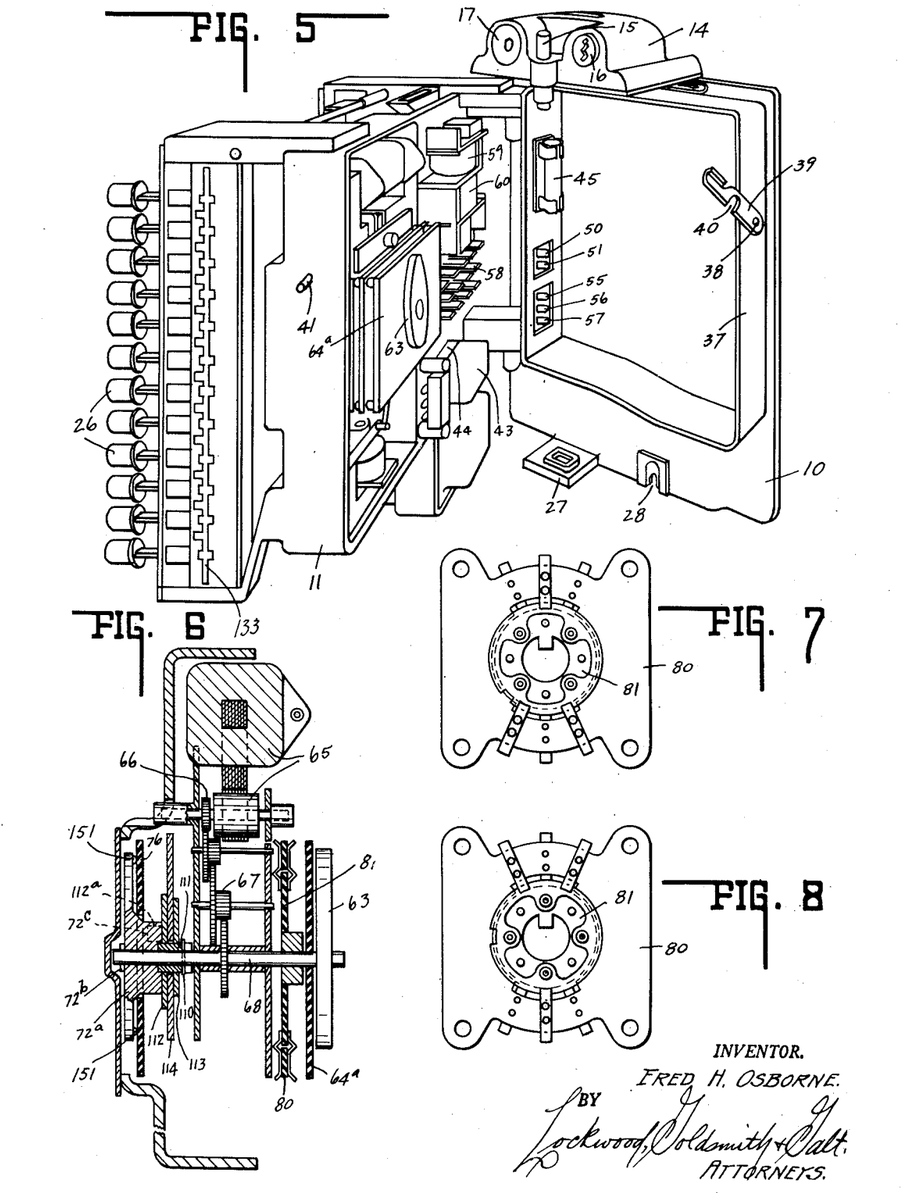
Fig. 5 is a perspective view of the wall box or local or remote station looking into the same when the cover is removed, the intermediate mechanism and frame being swung away but not detached from the back portion of the box.
Fig. 6 is a sectional view taken on line 6—6 of Fig. 4 and in the direction of the arrows.
Fig. 7 is an elevational view of one side of a switch structure.
Fig. 8 is a similar view of the opposite side thereof.

In Figs. 2, 3 and 5, 10 indicates a back plate or base to which is attached an intermediate frame construction 11, see Figs. 2, 4 and 5. Herein the latter, see Fig. 4, includes at one side spaced, offset, and aligned depending pins 12 receivable by complementary socket portions 13 carried at one side of base 10, see Fig. 3. Figs. 3 and 4 show the plate and construction detached while Fig. 5 shows the latter swung outwardly upon the base to expose the rear of the frame and mechanism carried thereby.

Extending upwardly from base 10, see Figs. 1, 2, 3, and 5, is the projection 14 that has mounted thereon the plunger 15, the key controlled lock 16, and the coin socket or inlet 17. A cover, see Fig. 1, has top 18, front 19, sides 20 and a bottom not shown. The top is recessed as at 21 to accommodate projection 14 on base 10. Portion 14 projects forwardly of the base 10 and overlies the intermediate frame structure 11 when the latter is collapsed against the base as shown in Fig. 2.

Figure 1:
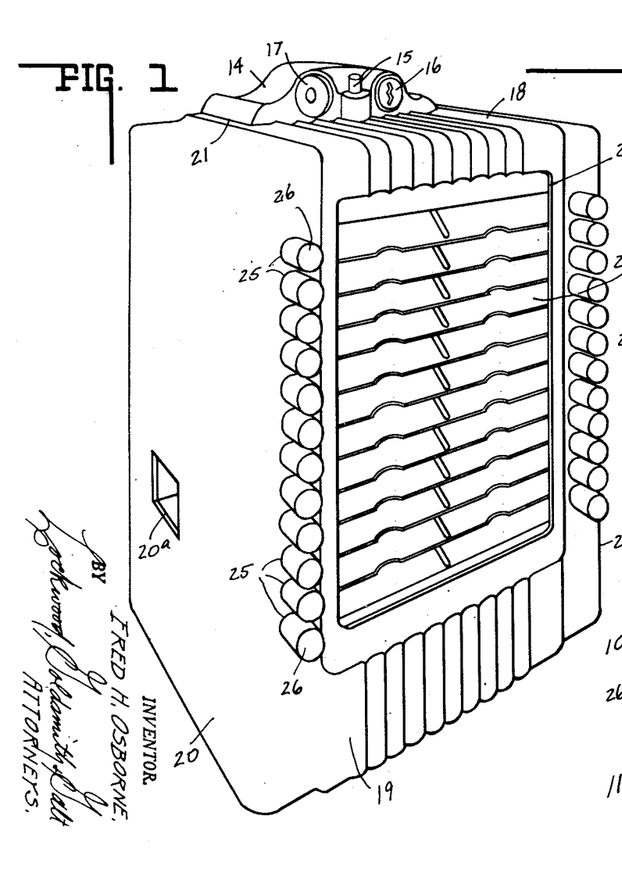
Fig. 1 is a perspective view of a so-called local or remote station or wall box.

The front 19, see Fig. 1, is recessed as at 22 and louvred as at 23 to receive selection or program legend strips not shown. Same are illuminated by light bulbs 24, see Fig. 2, carried by the main frame 11 of the intermediate structure. This recess 22 preferably is closed by a glass, etc., not shown, through which the selection designations are readily legible. The front 19, see Fig. 1, is also apertured as at 25 to expose the projecting individual selection buttons 26, shown also in Fig. 2.

The plunger 15 constitutes a coin or slug return control, the slug being released at recess 20ª, see Fig. 1, when plunger 15, see Fig. 2, actuates arm 15ª. Buttons 26 constitute individual selection controls, each of the latter controlling a switch 26ª. In the left hand portion of Fig. 9 same are diagrammatically arranged in one vertical series while in Figs. 1 and 2, the buttons 26 are shown divided and disposed in two vertical series.

The base 10, see Figs. 3 and 5, includes forward, apertured projection 27 and notch 28 in its lower end. The cover in its bottom carries a headed stud, not shown, or a hook that registers with the notch so that bar 29, notched at 29–A, see Fig. 3, when lowered can lock the cover to the base when the frame 11 is collapsed thereto.

The base 10 near the top thereof mounts a transversely disposed longitudinally elongated cover locking bar 30, and the same is associated with locking lugs (not shown) and interiorly carried by the cover top portion 18 near the open end thereof. As shown in Fig. 3 the arm 31 and pin 32 effect bar 30 reciprocation for cover locking and unlocking through key controlled lock 16. Arm 33, with pins 34 and 35 and pivoted at 36, is tiltable in accordance with bar 30 movement to effect raising and lowering of the cover locking bar 29. Thus the cover is three-point locked to and unlocked from the base 10 with the frame 11 therebetween.

The base 10 mounts a well defining wall 37, see Figs. 3 and 5, and pivoted thereon at 38 is a finger operable catch 39 having notch 40 for engaging a headed pin 41 carried by the frame 11 for holding the frame rigidly to the base.

When access is desired to the intermediate mechanism for any purpose, the cover is first unlocked and removed, the finger lock 39 is then released and the frame 11 is then tilted to expose the rear thereof if desired, or the frame can be removed from its pivotal support for, see Fig. 3, the cable 42 terminates in loose plug 43 that, even when the frame is in open position, as in Fig. 5, can be plugged into multiple socket 44. Of course, when the frame is detached from the base this socket and plug connection is separated.

In Figs. 3 and 5 the master fuse is indicated at 45. Current supply is suitably introduced to the device through the base as at 27 and conveyed by plug 43 aforesaid to the frame 11 carried electrical operative and control elements.

It is believed no further description or illustration is necessary to fully disclose the detachable and swingable mounting of the frame 11 upon the base 10, nor the locking of the same thereto, nor the locking of the removable cover over the frame 11 and to the base 10 to fully envelop the frame and the mechanism carried thereby.

It is to be understood that coin inlet 17 can accommodate individually any one of several denominations of coins such as a nickel, dime or quarter. After coin deposit, it discharges through frame carried coin chute 46 to a detector device of commercial type.

If not rejected and returned to the depositor it passes to a master control switch and then to an evaluator so as to register one, two or five plays and thence passes to a coin box. In any event the evaluator suitably actuates an accumulator to store up the depositor payment effect, and following playing of one record an accumulated unit is subtracted until all coin value accumulated is exhausted. As hereinafter pointed out the accumulator corresponding advance is 2, 3 and 6, respectively for values of 1, 2 and 5, respectively.

Selection, obviously, is made by pressing in the selected button or buttons 26 and these selections are held until the corresponding record has been played. Since there usually are several wall boxes in parallel, only one selection, if two or more boxes are actuated to make that selection, will be registered and played. Of course all depositors making such single common selection from different local stations will be satisfied simultaneously.

Figures 9, 10, 11, 12, 13:
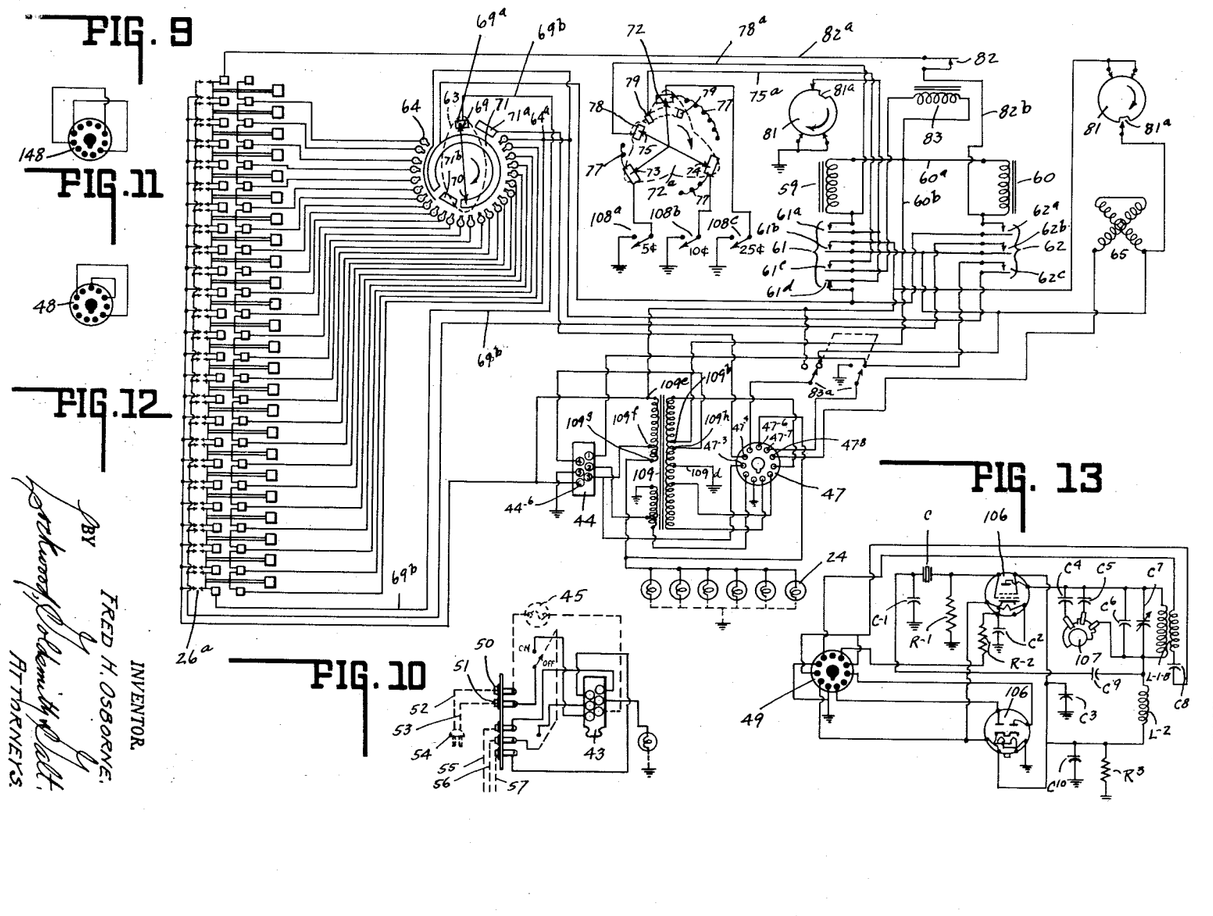
Fig. 9 is a wiring diagram of the major portion of the electrical system embodied in the invention and that which is common to both three-wire wired and radio or wireless types.
Fig. 10 is a similar view of the selective power supply portion utilized with the circuits shown in Fig. 9.
Fig. 11 is a diagrammatic view of the so-called two-wire system shorting plug.
Fig. 12 is a similar view of the three-wire system shorting plug.
Fig. 13 is a diagrammatic view of the so-called wireless attachment embodiment.

Following registration of the selection, the button or buttons 26 are returned to normal (cover projected or extended) position. As shown in Fig. 9, the playing is not effected for plural selection in the order of selection but only in the order of sequence as determined by the switch and circuit set up or arrangement.

If desired, each coin box 9, see Fig. 2, may be a separable unit and detachably applied as at 9ª, see Fig. 3, to the wall box and included therein. It can be serially numbered. Thus the serviceman and/or collector, can at each visit, regular or irregular, as desired or required, remove the sealed coin box 9, and replace same with an empty box. Thus actual coin counting can be effected at the home office of a community system or by the management only of an establishment having a large number of coin deposition selectors such as wall boxes on the establishment premises.

Reference will now be had to Figs. 9 to 13, more particularly rather than to the correspondingly illustrated parts in Figs. 2 to 8 and 14. As stated, Fig. 9 shows the major portion of the electrical circuits common to all three types of operation and such circuits, etc., carried by the frame 11 although Fig. 10 does show that a portion of the electrical circuits, are carried by the base 10. The two disclosures are incomplete, however, in that there must be applied thereto either the "shorting" plug of Fig. 11 or that of Fig. 12 for "wired" use, or the radio unit and plug of Fig. 13 for "wireless" use, all as more fully explained hereinafter.

Referring to Fig. 10, 45 indicates the master fuse and 43 the plug type connector. Immediately above same in Fig. 9 is the socket type connector 44 aforesaid. In that same figure and slightly to the right thereof is a multiple socket 47. This also appears in Fig. 2, lower left hand corner.

As stated, when "wired" service or use is contemplated, the shorting plug 48, see Fig. 12, or plug 148, see Fig. 11, is applied to said socket 47. When, however, "wireless" service or use is desired the plug 49, see Fig. 13, is applied to the socket 47 shown in Fig. 9. When "wireless" use is desired the corresponding terminals 50 and 51, see Fig. 10, on the base are connected to the ends of a conventional plug and a two-wire supply indicated as at 52 and 53 and terminating in plug 54. When, however, three-wire use is desired, the base mounted terminals 55, 56 and 57 are suitably connected to the ends of the three-wire supply. In either event, the two-wire and three-wire supply lines are introduced into the wall box through the aperture in portion 27, see Figs. 3 and 5. The five terminals, 50, 51, 55, 56 and 57 aforesaid are illustrated in Figs. 3 and 5 as well. The remainder of the circuit shown in Fig. 10 other than the terminals and fuse may be carried by the base and suitably connected thereto as shown in Fig. 10, the several connections being omitted from Figs. 3 and 5 for clearness.

On the rear of frame 11, see Fig. 5, are two spaced series of six contacts 58 and their corresponding representations are likewise found in Fig. 9. Similarly in said Figs. 4 and 5 are found the relays 59 and 60 exposed on the rear of the frame 11 and same also are illustrated in Fig. 9. The switches 61 and 62 respectively associated with said transformers are also found in Fig. 9. The rotative arm 63, circular series of contacts 64, see Fig. 4, and motor 65, see Fig. 6, also are illustrated in Fig. 9. At this point, therefore, it seems desirable to mention that the plug 48 shown in Fig. 12 is applied to the structure shown in Fig. 9 for current supply to the three terminals 55, 56 and 57 aforesaid.

Figure 14:
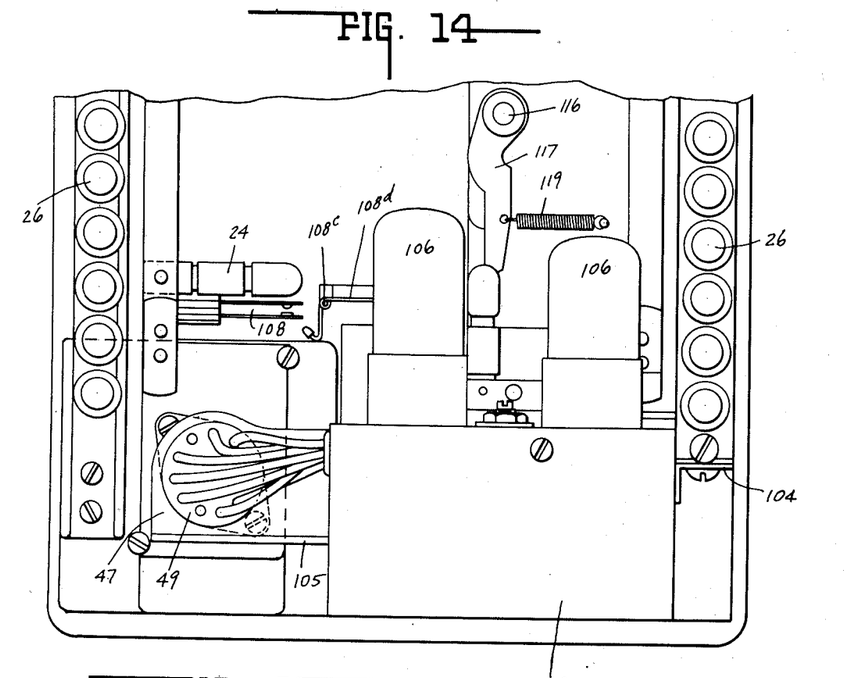
Fig. 14 is a view similar to Fig. 2 with the wireless unit mounted on the said intermediate portion.
Figure 15:
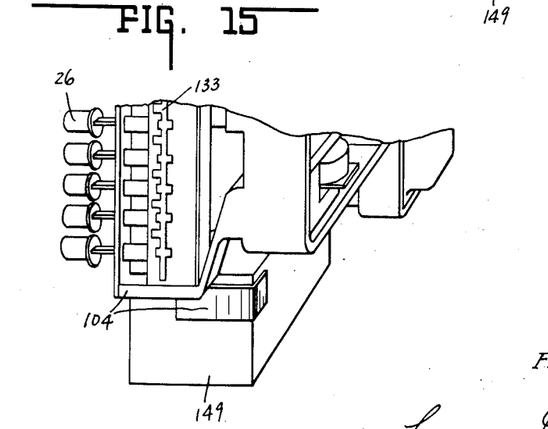
Fig. 15 is a perspective view of the lower end of the wireless equipped unit looking at the same from the rear of Fig. 14.

The wall box, the essentials of which are diagrammatically illustrated, is conventionally sold as a three-wire system. When two-wire operation is desired, the plug 148, see Fig. 11, is supplied. When wireless operation is desired the plug 49 and the unit 149, see Figs. 13, 14, and 15, is supplied, such unit being diagrammatically illustrated in Fig. 13 and to which reference will be had more fully hereinafter. Thus the wall box can be constructed for universal use and utilized for two-wire wired, three-wire wired or wireless operation interchangeably and as desired.

Reference will be had more particularly to Figs. 4, 6, 7 and 8, and Fig. 9, for the electrical association of the parts shown in the other figures. In Fig. 6 motor 65 through pinion 66 operates a gear train 67 rotating shaft 68 on the outer or rear end of which is mounted member 63 aforesaid. Member 63 includes yieldingly mounted contacts 69 and 70, the former selectively engaging contacts 64 on insulation plate 64a and the latter engaging contacts 71 on said plate. Note member 63 is not of equal length on opposite sides of the shaft.

Also rotatable by the shaft is the triple lobe member 72a having yieldingly mounted contacts 72—73 and 74 with a median contact 75. An insulation plate 76 includes arcuately disposed stepped resistors 77, see Fig. 9, and interiorly disposed contacts 78 and 79. Resistors 77 are of two, three and six step type corresponding to the coin values aforesaid and are shown in Fig. 9.

Stationarily supported is an insulation plate 80 having terminals and contacts on opposite sides thereof. This plate is centrally apertured and rotatable therein is insulation disk 81 suitably secured to shaft 68 for rotation thereby. Opposite sides of this disk carry ring contacts so disposed that they rotate between the opposite side mounted contacts on plate 80. One side of disk 81 constitutes the relay release switch while the other side constitutes the motor full cycle switch. All the aforesaid is more clearly illustrated in Figs. 7 and 8 and diagrammatically illustrated in Fig. 9. Herein three contacts always are associated with a ring contact, the ring contacts being insulated from each other.

In Fig. 9, 82 indicates an accumulator switch which is open until a coin is registered. 83 indicates the accumulator coil or relay. Also in Fig. 9 there is illustrated a double pole, double throw testing and use switch 83a, the first and third left hand contacts being for testing and service use while the second and fourth contacts are for normal or play purposes.

In Fig. 4, 83 indicates that coil and same has the core 84, the pole structure 85, and keeper 86 carried by arm 87 pivoted at 88 and spring constrained as at 89. Said arm 88 terminates in arcuately disposed teeth 90 and 91, the two alternately engaging ratchet 92 carrying stop pin 93 to engage stop 94 to limit clockwise rotation of the ratchet incident to step actuation when tooth 91 is released therefrom and the ratchet is advanced one tooth by a coil spring not shown in Fig. 4 but concentric with the ratchet support.

The ratchet is reversely actuated step by step by the dual arm structure 95—96, the latter at 97 pivotally supporting a pawl not shown that engages the ratchet. The relative position of arm portions 95 and 96 is adjusted at 98 and same are constrained by a spring not shown. The arm structure is constrained by spring 99 to released position and is rocked by an actuator on shaft 68. The pawl, not shown, is constrained by spring 100 to non-ratchet engagement. Stop 101 limits dual arm structure positioning when idle.

Insulation member 102 carried by the ratchet is operatively associated with the longer arm 103 of a normally closed switch having associated arm 104. When member 102 engages arm 103, incident to dual arm rotation (counter-clockwise) of the ratchet, this switch is opened. At such time also the stop pin 93 has almost rotated 360° and engages the opposite side of stop 94.

Thus the ratchet is step by step reversely rotated within the limits of the stops aforesaid to accumulate the coin value deposited and deduct the plays as made. The number of ratchet teeth determines the extent of money value which can be accumulated.

In Figs. 14 and 15, 149 indicates the chassis of the wireless embodiment diagrammatically illustrated in Fig. 13. In said figures 104 indicates a bracket support and 105 in Fig. 14 indicates a connector bracket. 106 indicates tubes and 107 indicates the crystal adapting switch. The tubes are not identical, see Figs. 13 and 14. The chassis therefore, when used, is disposed forwardly of the coin box 9, see Fig. 2.

In Fig. 9 below the triple lobe switch indication 72ª are illustrated the three coin switches 108ª, 108ᵇ and 108ᶜ selectively controlled by a nickel, dime, and quarter, respectively. 59 indicates the coin relay coil and 60 the selector button relay coil. The former operates or controls four switches, three of which are normally open as shown and one of which is normally closed. Coil 60 operates or controls three switches, all of which are normally open. In the lower central portion of Fig. 9, 109 indicates the power transformer.

Reference will now be had to Figs. 2, 4 and 6. In the latter the shaft 68 has suitably secured to it as by pin 110 a sleeve 111. Rigid with and rotatable by sleeve 111 is a pair of spaced cams 112 and 113 separated by a plate 114. A lug 112ª seats in a notch 72ᶜ in the hub of member 72ª previously described. A pin 72ᵇ retains the aforesaid in assembled relation.

Now referring to Fig. 2 the sleeve 111 is shown flatted to take the said cams. Cam 113, see Figs. 18–20, actuates follower arm 115 rigid with rock shaft 116 carrying external arm 117 terminating in coil claw or gate member 118 disposed in offset relation, see Figs. 6, 18 and 19. A spring 119, see Fig. 2, normally constrains the follower to cam contact.

Cam 112, see Figs. 6 and 18–20, engages follower 120 carried by arm 121 rigid with rock shaft 122 having thereon upwardly extending arm 123 slotted at 124. A stud 125 carried by one arm 126 of a bell crank pivoted at 127, is seated in said slot so that the bell crank is cyclically tilted in each rotation of shaft 68.

Figure 18:
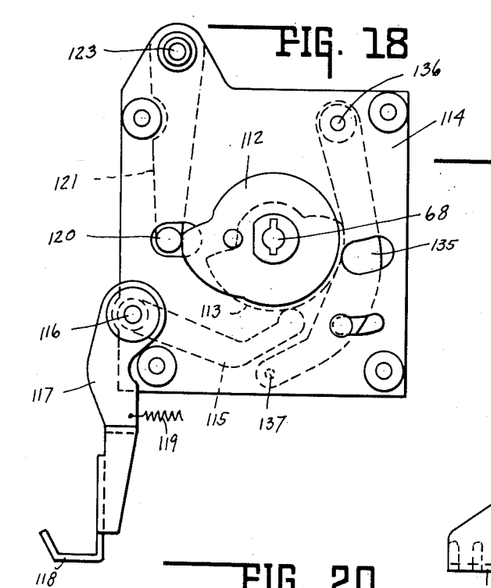
Fig. 18 is an elevational view of the coin claw, certain associated cams, cam activated levers and the so-called main power shaft of the invention, certain of the parts being shown in Figs. 2 and 14.
Figure 19:
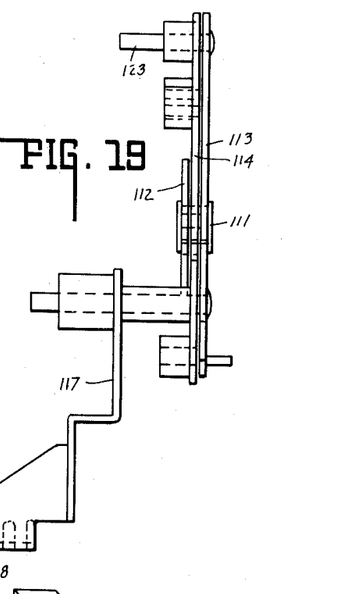
Fig. 19 is a side elevation thereof and shows in greater detail certain parts shown in Fig. 6.
Figure 20:
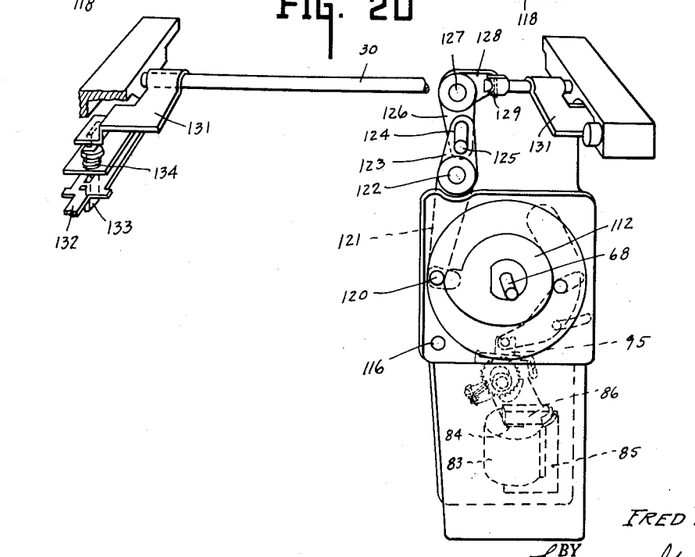
Fig. 20 is a perspective view of the selection button clearing mechanism and its association with the mechanism shown in Figs. 2, 18 and 19.

The other arm 128 of said bell crank actuates arm 129 on rock shaft 130 carrying plate arm 131 at opposite ends. Latch bars 132 are operatively associated with the selector buttons 26, or rather their stems, and said bars in turn are associated with clearing plungers 133, spring constrained at 134 to normal position. When arm 131 is tilted it actuates members 132 to effect return of button 26 to exposed position in opposition to spring 134. Thus all buttons are cyclically returned to projected position.

Cam 112, see Fig. 18, also cyclically oscillates arm 135 pivoted at 136 upon plate 114. This arm is gravity constrained toward said cam and its lower free end terminates in a stud 137 disposed in the notched upwardly extending end of lever member 85, see Fig. 20. Thus cyclically the ratchet is actuated by said stud, as it were. Thus the ratchet is rotated counter-clockwise one step, or two teeth, to register cancellation of a play. The accumulator coil, however, is actuated in the accumulating direction by the coin deposited and to the extent indicated in accordance with the value of said coin. Herein approximately twenty plays can be accommodated by the accumulator.

The respective coin switches 108ª, 108ᵇ, and 108ᶜ in Fig. 9 are shown in Fig. 2 and indicated by the numeral 108 therein. The tiltable coin levers, of which there are three, positioned side by side, are indicated by 108ᵈ and pivoted at 108ᵉ. Thus each coin delivered from the claw tilts the appropriate lever causing the other end to close the respective coin switch. The tilt of members 108ᵈ is limited by stop 108ᶠ, see Fig. 2, and coins, after effecting tilting, are directed by guide 9ª to coin box 9. The accumulator switch 82 is associated with the coin switch as previously described and diagrammatically illustrated in Fig. 9.

Figure 16:
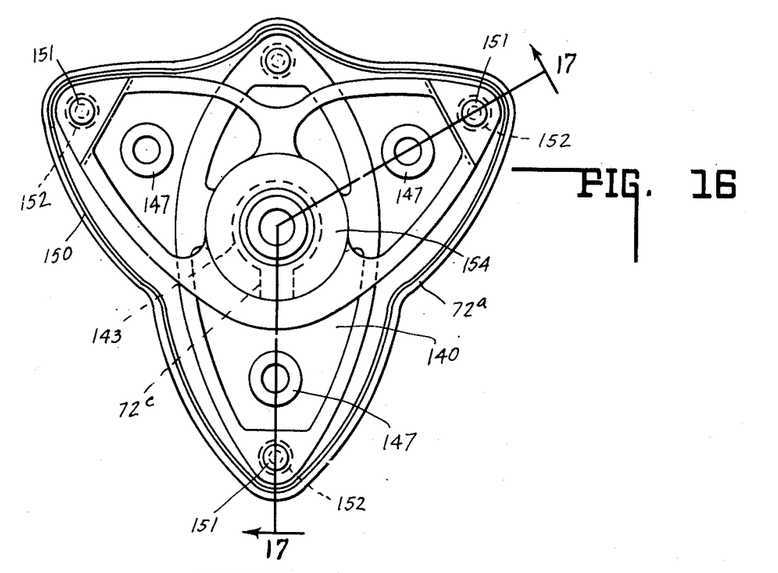
Fig. 16 is an elevational view of a triple lobe switch included in the invention, the cover being omitted.
Figure 17:
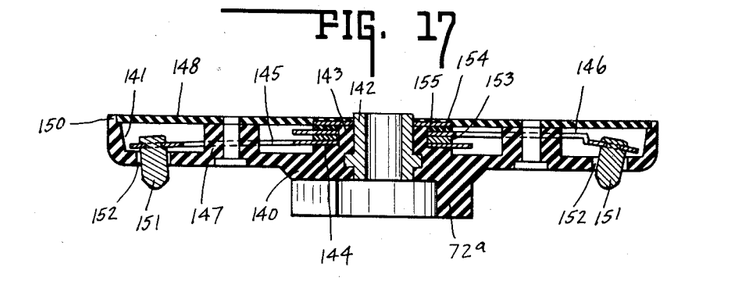
Fig. 17 is a sectional view of said switch and is taken on line 17—17 of Fig. 16 and in the direction of the arrows.

In Figs. 16 and 17 there is illustrated in detail the triple lobe switch unit 72ª which as stated is also illustrated in Figs. 6 and 9. The body portion 140, see Fig. 17, is of plastic or molded insulation material and includes cavity 141 and metallic sleeve 142. Surrounding said sleeve is neck 143 and a shoulder 144 to receive spring stampings 145 and 146. Pierced bosses 147 on the body portion are furnished for spacing cover 148 and riveting it in place in the rabbet 150 of said body.

Springs 145 and 146 are ogival in outline and are pierced with openings of an area calculated to leave margins of predetermined breadth. This breadth governs the pressure to be exerted by the contact 151 which is riveted to the said spring near the outer end thereof.

Said contacts 151 extend through the holes 152 in housing 140. In case of multiple springs a washer 153 may be interposed between same. When the switch is to control multiple circuits the washer should be of insulation material. Herein it is shown as of conducting material and the spring arms are in electrical contact. Washer 154 and disc 155 complete the assembly.

Thus the contacts of this unit may be preloaded to known optimum pressures which do not change because the arms are protected from bending out of their preset form. This unit also is shock proof and practically dirt proof. The long string bearing provided by the sleeve 142 on the shaft 68 permits marked inequalities, when required, of contact pressure required for successful operation.

The three tip disposed contacts 151 contact the two, three, and six step resistor contacts, see Fig. 9, while the median contact 151, see Fig. 16, contacts the single and dual spaced inner disposed contacts, see Fig. 9, carried by the insulation plate, see Fig. 6.

*Operation*

Reference will now be had primarily to Fig. 9 and the supplementary diagrammatic circuit figures. When a coin of the selected value (5, 10 or 25¢) is deposited the same passes through the detector device, if not rejected, and lands upon the appropriate portion of the claw 118 and then tilts the corresponding lever 108ᵈ to close the corresponding switch 108ª, 108ᵇ, or 108ᶜ to ground.

Contact arm 72ª, contact 78 and line 78ª thus complete the circuit to relay coil 59. When energized the three upper switches 61 are closed and the lower one is opened. The first or interlock switch is designated 61ª, the second or motor switch is designated 61ᵇ, the third or isolation switch is designated 61ᶜ and the fourth is designated 61ᵈ.

When relay coil 59 is energized the motor circuit is closed at switch 61ᵇ, the interlock switch is closed and switch 61ᶜ is closed. The latter closes the circuit to line 75ᵃ and the accumulator coil 83. When this coil is energized switch 82 is closed to connect line 82ᵃ to line 82ᵇ to selector button relay coil 60, which, when energized, closes the three switches, 62ᵃ (interlock) switch, 62ᵇ (motor) switch, and 62ᶜ (isolation long pulse and selection) switch, respectively.

Thus the first coin initiated impulse causes the accumulator switch 82 to close and remain closed while all such impulses are being registered by the accumulator and thereafter holds closed until opened as hereinafter described.

The ovoidal shaped arm 63, see Fig. 4, the triple lobe arm 72ᵃ, see Figs. 16 and 17, and the member 81, see Figs. 7 and 8, are all simultaneously rotated by motor 65 so that when the circuit is initially closed at 78 by coin deposition at the respective coin switch, this comprises a pick up circuit and motor 65 is energized because then switch 61ᵇ is closed. Switch 61ᵈ, by then opening, prevents a circuit from contact 71 of the ovoidal arm controlled switch to the coil of relay 60 through switch 61ᵃ controlled thereby.

During the registration aforesaid, the motor 65, as stated, also rotates switch member 81 of the relay release switch, see left hand disk 81 in Fig. 9, until the notch 81ᵃ in its edge passes the contact in series with the switch 61ᵃ of relay 59, thereby deenergizing this relay coil.

Cam follower 115, upon motor rotation of cam 113, then releases the coin to the coin box thus permitting the opening of the respective coin controlled switch 108. Further rotation of motor 65 then effects, through the right hand switch 81, an opening of the motor circuit.

When the pick up relay 59 is energized as initially set forth, the selector relay 60 is energized for selection circuit maintenance. Hence, a "pick up and stick" relationship is established. When relay 59 is deenergized, switch 61ᵃ is again closed thereby connecting switch 61ᵃ with the left hand relay release switch 81. This prepares the remote control unit for selecting purposes.

Accumulator switch 82 having been closed as aforesaid by actuation of the coil 83, a circuit is closed from the ground of the relay release switch 81 through switch 61ᵈ to segment 71 of the selector switch and thence through the ovoidal arm contacts 70 and 69 to segment 69ᵃ and line 69ᵇ to the button 26 actuated switches 26ᵃ and from the actuated (selected) switch 26ᵃ by line 82ᵃ to the accumulator switch 82, thence, through coil 60, lines 60ᵃ and 60ᵇ to tap 109ᵇ on the secondary of transformer 109 grounded at tap 109ᵈ.

This causes the relay 60 to be energized and remain so by reason of the contact of its locking switch 62ᵃ now closed. Switch 62ᵇ also is closed to prepare a circuit from tap 109ᵉ of transformer 109 to the motor full cycle switch 81 (left), thence, through motor 65 to pin 47—8 of plug 47 which is jumper connected to pin 47—3 through the socket, which pin 47—3 leads to tap 109ᶠ of transformer 109. This circuit, which is open at the full cycle switch, is paralleled by a circuit from motor 65 through switch 62ᵇ to the normally open contacts of the switch 26ᵃ controlled by the selector buttons 26, thence, to pin 44—6 of the plug and the socket 44 which is connected to the feeder by terminals 50, see Fig. 10.

The selector buttons 26 are mechanically latched at the beginning of a selection cycle and freed at the cycle's end by the apparatus shown in Fig. 20, the latch operating to hold in the button which has been pressed, and prevent all others from being pressed. Thus the normally open contacts of a pressed button are held closed during the greater part of a selection cycle. At the same time the normally closed contacts are held open.

Hence, when a button 26 is latched, a circuit is closed through its normally open switch 26ᵃ to motor 65 which in rotor rotation carries with it the cycling dics 81 left, 81 right, multi-lobe switch member 72ᵃ and switch arm 63 of the relay release switch and motor full cycle switch.

As the rotor of the motor 65 starts rotating contacts 70 and 69 of arm 63 bridge the contacts or segments 71ᵃ and 71ᵇ. The latter is grounded at pin 47—4 of plug 47 while through the former (segment 71ᵃ) a circuit runs to switch 62ᶜ of relay 60, thence through the service-play switch 83ᵃ to pin 47—7 of plug 47 to cathode of the 6V6GT/G tube 106 (top) Fig. 13.

Thereafter contact 69 revolves on the circle of contacts 64, establishing a circuit through each and the normally closed points of buttons 26 until it reaches the contact 64 connected to the switch points 26ᵃ of the depressed button 26. The circuit now being open beyond that particular button, the contact 69, on continued rotation, conveys no current after leaving such depressed button corresponding contact 64. Each make and break at the "prior" contact 64 so made causes an impulse to be sent through 64ᵃ to the cathode of said tube 106 (see top of Fig. 13), and as described above for wireless operation. For wire operation the impulse is sent to the stepper at the central station.

The notch in the end of the motor full cycle switch rotor 81 and the radii of contacts associated therewith, see upper right hand portion of Fig. 9, are angularly arranged so that when the notch registers with the contacts, the rotary switch arm 70 comes to rest upon segments or contacts 69ᵃ and 71. With each such cycle the accumulator is reversed one step until its switch 82 is opened, the play values accumulated on it being removed successively until the number of selection cycles equals the number of impulses transmitted to the accumulator during the coin registering cycle.

All this occurs at the local station whereas the signal (impulses determined by the selected selector switch 26ᵃ) are transmitted to the central station where a stepper is actuated to register the selection and hold it until the play is made. When the selection is registered other selections may be registered in succession until the coin value is exhausted. Since the present invention may be utilized with many forms of such registers and central station apparatus no specific reference need be had thereto in this disclosure.

*Two wire system*

In the two wire system, the plug 148 shown in Fig. 11 is applied to socket 47, see Fig. 9. Plug 54 and lines 52 and 53, see Fig. 10, are utilized. Thus the line cord and two wires are connected from the wall box (represented by Fig. 9) to the phonograph, stepper and register not shown.

Terminals 50—51 supply current to the transformer 109 and motor 65. In two wire operation 117 volt taps 109ᶠ and 109ᵉ on transformer 109 are used. These taps are preferred because such current as is drawn from the supply lines will not decrease the voltage.

*Three wire system*

In the three wire system the plug 48, see Fig. 12, is used. It is applied to socket 47, see Fig. 9. Current supply is by a three wire plug connection terminating at terminals 55, 56 and 57, see Fig. 9. To insure proper voltage, because of decreased current that can be drawn in the secondary, taps 109$^d$ and 109$^h$ are utilized on the primary and taps 109$^g$ and 109$^i$ are used on the secondary.

Wireless system

In wireless operation plug 49 and associated circuit shown in Fig. 13, is applied to socket 47, see Fig. 9. The two wire plug 54 and lines 52—53 are used for power supply purposes.

Since the transmitter shown in Fig. 13 is the subject of a copending application it will be briefly described herein for no claim herein is specifically made thereto. This application is Serial No. 717,716, filed Dec. 21, 1946.

The oscillator circuit is as follows: Feed back is taken across coil L-2, fed back through capacity C-9 to crystal C and one (control) grid of the amplifier tube 106 (top tube). Resistance R-1 is the return to ground for this grid. Condenser C-1 acts with condenser C-9 as a voltage divider to apply predetermined voltage. Cathode resistor R-2 provides proper bias and condenser C-2 is the by-pass for same.

Condenser C-10 and C-3 are respectively a filter and bypass condenser, while R-3 indicates a bleeder resistor. Tank coil L-1 is the oscillator and connects to the plate of the amplifier tube. This plate circuit is tuned to crystal frequency by combinations of capacities C-4, C-5, C-6 and C-7.

The first three are cut in one at a time by switch 107 depending upon which crystal is used, there being three, which resonate at frequencies of 221, 226 and 231 kc. Capacity C-7 is the trimmer to adjust for peak performance, that is, highest voltage output. This capacity compensates for manufacturing variations such as errors in inductor and capacitators.

The lower tube 106 is the rectifier tube. L-1-B is magnetically coupled to oscillator coil L-1 in such a manner that proper relationship between tube, plate circuit and power line is attained without effect on the frequency of the oscillating circuit. Capacity L-8 is in series between coil L-1-B and the power line to isolate power line frequencies from coil L-1-B.

Service switch 83$^a$, see Fig. 9, when swung to the left, takes control of the oscillator from the relay release, motor full cycle and selector button switches and puts a steady state signal directly into the power line for the purpose of supplying signal for alignment adjustments in the receiver not shown but previously referred to as included at the central station. This eliminates the use of a signal generator.

Briefly the foregoing selection operation may be summarized as follows: Deposition of a proper coin initiates motor operation, the control being of "pick up and stick" character. During such motor rotation of single cycle type the coin value is first registered upon the accumulator and then impulses, corresponding to the selected selection, are generated and transmitted to a receiving device for record selection and play purposes. Upon playing or registration of the selection, the accumulator is de-accumulated one play, that is, the ratchet wheel is reversely rotated one step. Since in cyclic motor operation a cam thereon effects a cancellation equivalent to one play, coin deposition always provides an additional pulse from the accumulator coil. The coin is held until its value is registered. Then it is released to the coin box. However, in the interval the holding circuit is established and when the accumulation has been effected the selection circuit is established and the selection is registered by pulses as described. The motor completes one rotation cycle, that is, rotates shaft 68 once for each selection made provided the circuits are conditioned for selection purposes by coin deposition or coin value accumulation. As stated, selection cannot be made, that is, signals be sent even though the button be depressed, as long as the system is registering a coin value.

The accumulator coil is pulsed plus one because every time the motor rotates shaft 68 one revolution it cancels one play off the accumulating ratchet through the mechanical actuation of the cam as described.

Contact 69$^a$ of the ovoidal switch is provided to prevent cheating the wall box by "jiggling" the line plug to that wall box. Also in three wire operation the circuit from contact 71$^a$ to 71$^b$ provides the long pulse necessary to "set up" the stepper in the central station through voltage phasings, thus preventing the cheating of the phonograph at the central station.

As previously explained, a change from two to three wire operation, etc., requires use of different taps on the transformer to secure proper voltage, thus the extra winding between taps 109$^g$ and 109$^f$ for three wire and the extra winding between taps 109$^d$ and 109$^b$ for two wire make up the loss.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A wall box structure supporting and enclosing selecting and controlling circuit controlling switch mechanism comprising a flat supporting back base; an intermediate frame swingably and removably supported on said base and supporting on its opposite faces circuit controlling operated parts; sub supporting frames supported on the front face of said swingable frame at the opposite edges thereof; circuit controlling switch members carried by said supporting sub frames and a cover member having side and end walls embracing said frames and having openings in its face to accommodate the last mentioned circuit controlling switch members.

2. A wall box structure supporting and enclosing selecting and controlling circuit controlling switch mechanism comprising a flat supporting base having formed on its front face a receiving pocket; an intermediate frame swingably supported at one side of said base and supporting on its opposite faces circuit controlling apparatus, said pocket on said supporting base being adapted to receive those circuit controlling parts supported on the rear face of said swingable frame; at least a portion of the operating parts supported on the front face of said frame comprising projecting members, and a cover member having side and end walls embracing said frame, having openings in its front face to accommodate said projecting members on the swingable frame; and means for interlockingly connecting said cover to said base.

FRED H. OSBORNE.

REFERENCES CITED

The following references are of record in the file of this patent:

UNITED STATES PATENTS

| Number | Name | Date |
|---|---|---|
| 1,174,809 | Bissell | Mar. 7, 1916 |
| 1,561,490 | Schlupp | Nov. 17, 1925 |
| 1,669,806 | Bretz | May 15, 1928 |
| 1,718,374 | Oberst | June 25, 1929 |
| 1,731,352 | Schermack | Oct. 15, 1929 |
| 2,063,099 | Loock | Dec. 8, 1936 |
| 2,240,937 | McNaney | May 6, 1941 |
| 2,243,963 | Kleinknecht | June 3, 1941 |
| 2,265,124 | Andres | Dec. 9, 1941 |
| 2,388,595 | Boyajian | Nov. 6, 1945 |
| 2,389,327 | Rockola et al. | Nov. 20, 1945 |
| 2,411,612 | Boyajian | Nov. 26, 1946 |
| 2,437,555 | Rees | Mar. 9, 1948 |
| 2,440,063 | Andrews | Apr. 20, 1948 |